United States Patent [19]

Kume

[11] Patent Number: 4,763,539

[45] Date of Patent: Aug. 16, 1988

[54] MECHANICAL CONVERTER FROM ROTATIONAL TO LINEAR MOVEMENT

[76] Inventor: Takeshi Kume, 3-10-1 Tsukaguchi-honmachi, Amagasaki 661, Japan

[21] Appl. No.: 825,064

[22] Filed: Jan. 31, 1986

[30] Foreign Application Priority Data

Feb. 2, 1985 [JP] Japan .................................. 60-018828
Mar. 14, 1985 [JP] Japan ............................. 60-037363[U]
Jun. 7, 1985 [JP] Japan ............................. 60-086437[U]

[51] Int. Cl.⁴ .............................................. F16H 29/02
[52] U.S. Cl. ................................... 74/89.15; 74/424.6; 104/172.1; 104/166
[58] Field of Search ................. 74/424.6, 424.7, 85.15, 74/424.8 R; 474/203; 182/133; 104/166, 172.1, 172.5, 167

[56] References Cited

U.S. PATENT DOCUMENTS 1,434,457 11/1922 Stahl .................................... 74/424.6
2,752,883 7/1956 Curtis .................................... 104/167
4,341,128 7/1982 Murokoshi et al. ............... 74/424.6

FOREIGN PATENT DOCUMENTS 1009739 11/1965 United Kingdom ................ 104/166

Primary Examiner—Kenneth J. Dorner
Assistant Examiner—Gerald A. Anderson
Attorney, Agent, or Firm—O'Toole, Marshall, Gerstein, Murray & Bicknell

[57] ABSTRACT

This disclosure relates to an apparatus for converting rotational movement into linear movement. The apparatus includes a roller unit and a rotatable screw. The roller unit is adapted to be journaled on a fixed body, and has peripheral flanges axially spaced so as to have a substantially constant pitch. The screw is adapted to be journaled on a movable body in parallel with the roller unit, and to be rotatably driven. The screw includes an outer thread having a pitch for engagement with the flanges, and rotation of the screw causes the movable body to travel along the roller unit.

2 Claims, 3 Drawing Sheets

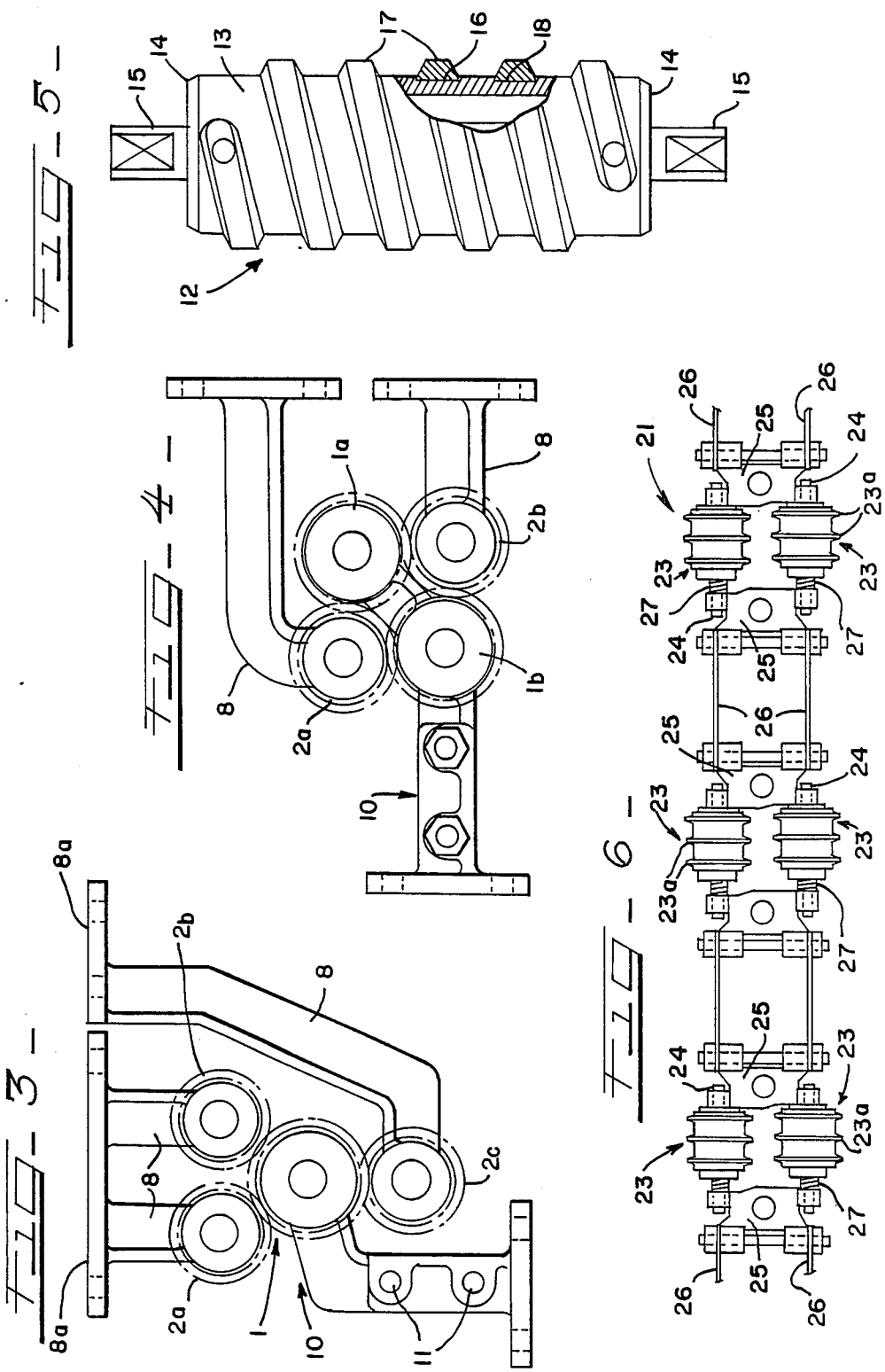

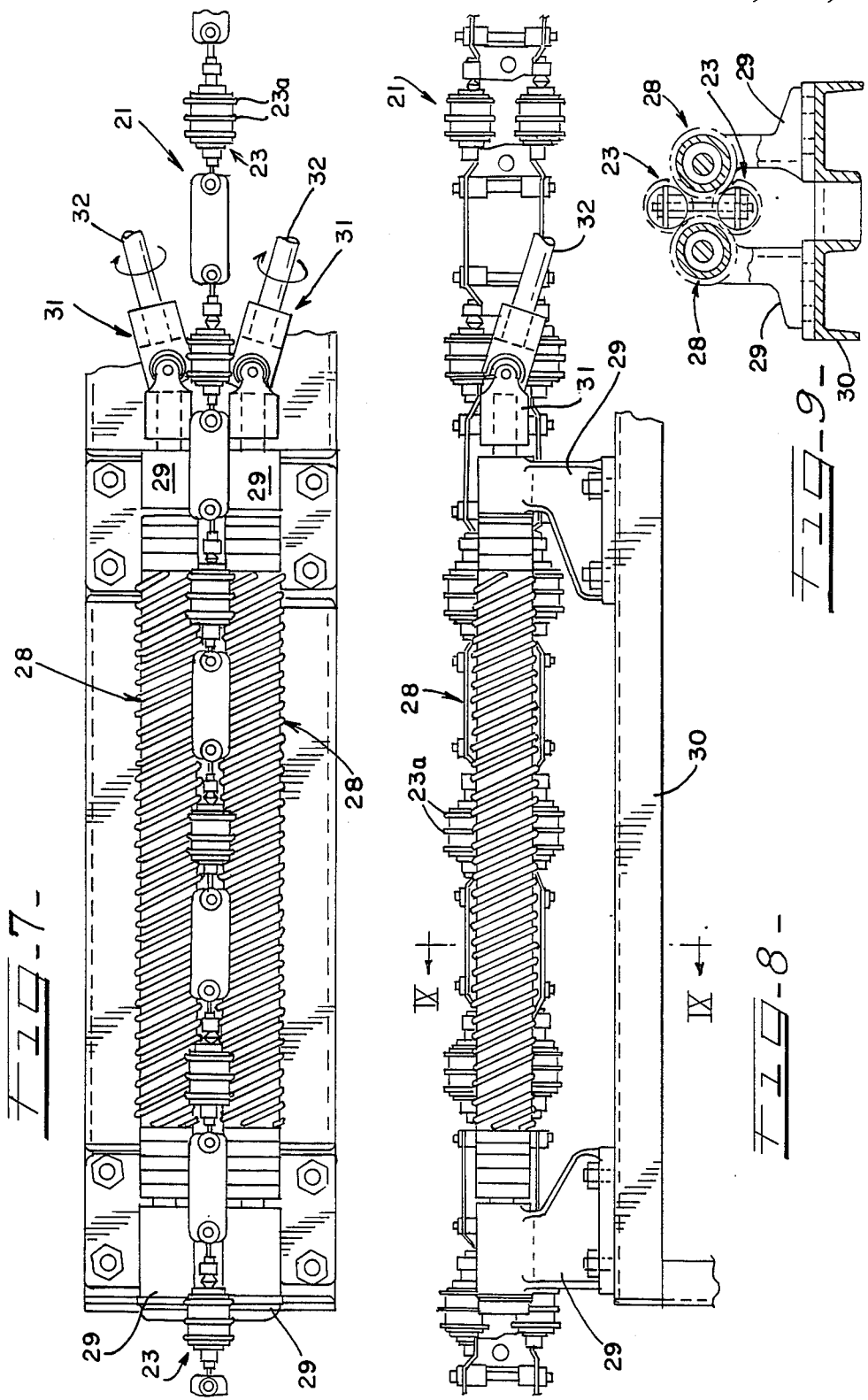

MECHANICAL CONVERTER FROM ROTATIONAL TO LINEAR MOVEMENT

FIELD AND BACKGROUND OF THE INVENTION

The present invention relates to an apparatus for converting rotational movement of one member into a linear movement of another member to produce a linear thrust.

Known multi-purpose mechanisms for converting rotational to linear movement include a rack and pinion combination, or a screw and worm gear combination. They have the disadvantage that, in such a rack and pinion combination, the rotational speed of the pinion should be kept low, and in a mechanism with a screw, the size of the screw limits the length of linear movement.

It is a general object of this invention to provide an uncomplicated multi-purpose converter from rotational to linear movement, which allows for any desired length of linear movement.

SUMMARY OF THE INVENTION

Apparatus according to the invention comprises roller means and rotatable screw means. The roller means is adapted to be journaled on a fixed body, and has peripheral flanges axially spaced so as to have a substantially constant pitch. The screw means is adapted to be journaled on a movable body in parallel with the roller means, and to be rotatably driven. The screw means includes an outer thread having a pitch for engagement with the flanges.

BRIEF DESCRIPTION OF THE DRAWINGS

Preferred embodiments of the invention are described as follows with reference to the accompanying drawings, wherein:

FIG. 3 is an end view partially in cross section of a second embodiment;

FIG. 4 is an end view partially in cross section of a third embodiment;

FIG. 5 is a side view, partially broken away, of a modified screw of the apparatus;

FIG. 6 is a fragmentary side view of a link chain for engagement with screws, according to the invention;

FIG. 7 is a fragmentary front view of a fourth embodiment, including the link chain shown in FIG. 6;

FIG. 8 is a fragmentary side view of the apparatus shown in FIG. 7; and

FIG. 9 is a sectional view taken along the line IX—IX of FIG. 8.

DETAILED DESCRIPTION OF THE DRAWINGS

Figure 1:
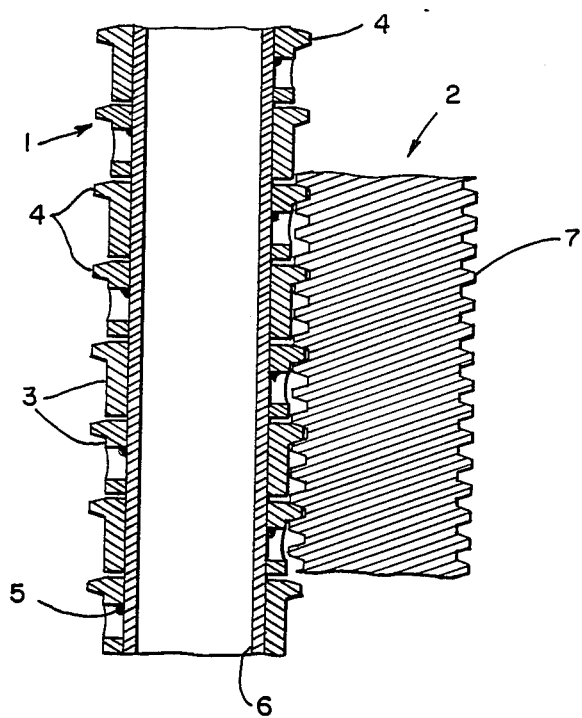
FIG. 1 is a fragmentary view in axial cross section of apparatus according to the invention.

The construction shown in FIG. 1 includes roller means formed by one or more roller units 1 and a screw 2 engaging the units 1.

The unit 1 includes a number of annular segments 3, each having a peripheral flange 4 formed thereon in the shape of a screw thread in axial cross section. The segments 3 are mounted on a pipe 6 and may be welded thereto as indicated at 5, or may instead be pinned thereto, so that the flanges 4 have a constant pitch.

The thread 7 of the screw 2 has a pitch that corresponds to the pitch of the flanges 4 so that the thread and the flanges engage together.

Figure 2:
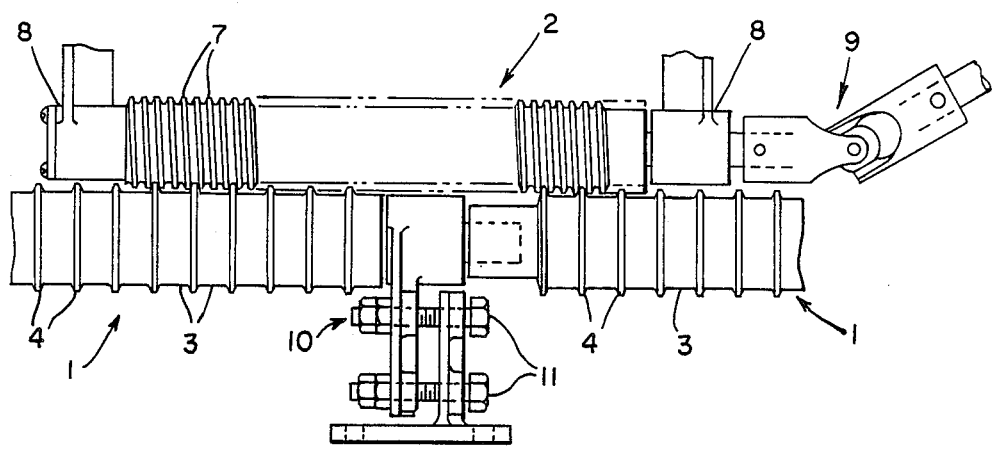
FIG. 2 is a fragmentary side view of the apparatus of FIG. 1.

In FIG. 2, a plurality of roller units 1 (as shown in FIG. 1) are mounted in substantially aligned positions and may extend horizontally. The units 1 are journaled and supported at both ends by bearing supports 10 on a firm support so that each unit 1 can independently rotate. The units 1 are coaxially mounted in end-to-end relation (or in series) to form an extended length of rail. The units 1 are preferably slightly movable axially relative to each other and the bearing supports 10, and each bearing support 10 has bolts 11 for axially adjusting each unit so that the pitch of the flanges 4 between adjacent roller units 1 may be adjusted.

A screw 2 (as shown in FIG. 1) is journaled at both ends by bearing supports 8 on a vehicle or carrier (not shown), and extends in parallel with the units 1 with the threads 7 in engagement with the flanges 4 of the roller units 1. The screw 2 can be rotatably driven by a universal joint 9 connected to a conventional drive (not shown) mounted on the vehicle. The screw 2 may therefore have a limited length and not as long as the units 1.

The junction, which does not have flanges 4, between adjacent roller units 1 (at each support 10) is sufficiently shorter than the length of the screw 2 so that the junction is bridged by the length of the screw 2.

The roller units 1 are the most numerous part of the apparatus because they extend the entire length of the track, and they should therefore be easily formed and assembled and be structurally strong. The segments 3 of each unit 1 may be separately formed of cast steel or forged steel. On the other hand, the segments 3 may be formed of sintered metal or ceramic powder in order to facilitate mass production and save steps in the manufacturing process. The pipe 6 of the unit 1 is more rigid in bending strength than a solid shaft, which is particularly important when the interval between the bearing supports 10 is long.

In operation, the rotation of the screw 2 by turning the coupling 9 is transmitted to the engaged roller units 1, and forces them to rotate along with the screw. The turning screw also produces a linear thrust, and since the units 1 are held against linear movement, the screw moves along the units. After passed by the screw 2, each of the units 1 continues to rotate by inertia for awhile and then stops.

In FIG. 3, a generally horizontally extending roller unit 1 is shown, having the construction shown in FIG. 1 and supported by bearings 10 as shown in FIG. 2. The unit 1 is engaged by three parallel screws 2a-2c which are circumferentially spaced around the unit 1. The screws are supported by bearings 8 having mounting flanges 8a which are secured to a vehicle (not shown), and at least one of the screws is driven.

The two screws 2a and 2b are positioned over (on one side of) the roller unit 1 on opposite sides of its axis, and the screw 2c under (on the other side of) the unit 1. This arrangement stabilizes the drive mechanism and guides the screws so that they do not disengage from the unit 1. The upper screws 2a and 2b stabilize the vehicle because they are held against the unit 1 by gravity.

In FIG. 4, two generally vertically extending, radially spaced parallel roller units 1a and 1b are shown having the construction shown in FIG. 1. The units are journaled by a bearing support 10 fixed to a frame (not shown) and the unit 1b, and the support 10 also extends to and supports the unit 1a.

Two radially spaced parallel screws 2a and 2b are journaled by bearing supports 8 and fastened to a vehicle (not shown). The vertical screws extend between and engage the roller units 1a and 1b at locations which are between the units. This arrangement is effective for preventing disengagement of the screws from the units.

The arrangement of the parts shown in FIG. 4 is particularly suited for vertical movement but it could also be used for horizontal movement with increased rigidity.

Constructional characteristics of the present invention are as follows:

A. The screw (or at least one of the screws) 2 is driven. If the roller units 1 were driven instead, no rotation would be transmitted, except when frictional force axially acts to form a combination of "friction wheels".

B. The annular segments 3 of each roller unit 1 are formed separately and are mounted on a pipe or shaft. If the segments were integral with the shaft, the unit must be made by precision machining in order to accurately form the pitch of the flanges 4.

C. Each roller unit 1 is rotatably journaled independently from the others, and only the unit or units 1 engaged by the screw or screws 2 rotate therewith. Since the loaded operation of each unit 1 lasts only about ten seconds, in a typical use, as the screw 2 passes it, the bearing loads are relatively small.

D. The engagement between the roller unit 1 and the screw 2 with their axes in parallel requires relief angles on the flanges 4 and the thread 7, which may be triangular or trapezoid in cross section (see FIG. 1).

E. The distance of movement of the screw 2 is short relative to its rotational speed. Since the pitch of the thread 7 is small relative to the length of the screw 2, the screw must be rotated at a high speed to accelerate the linear movement. Consequently, the screw 2 is preferably driven by a multi-purpose motor without a reduction gear in most uses.

Characteristics in operational principle of the invention are as follows:

A. The rotational force is required to be transmitted from the screw 2 to the roller unit 1, and there is substantially no slip between them.

B. The distance of linear movement of the screw 2 caused by one revolution equals the pitch of the thread 7.

C. The roller unit 1 is engaged by the screw 2 at a plurality of points, thereby distributing the load due to the production of thrust.

D. Since both the thread 7 and the flanges 4 have relief angles as stated above for mutual engagement, it is easy to achieve an engagement designed to eliminate play, which cannot be avoided in gears and the like.

Additional characteristics are as follows:

a. The rate of linear movement (=rotational frequency x thread pitch) is accurate.

b. The braking force is large. (The linear movement stops at the same time that the screw 2 stops rotating.)

c. The retaining force is large. (The holding force is large so long as the parts do not disengage.)

d. There are substantially no errors in size due to wear after operation for a long time. As a result, smooth operation is possible even though there are substantially no slip, looseness and play.

The effects of the invention are as follows:

A. It is easy to achieve accurate distance of movement and strong retaining force as is the case with screws, and in addition long distance of movement which cannot be obtained with screws.

B. Despite a relatively high rotational speed of the parts, the linear movement is at a low speed and strong. This enables a multi-purpose motor to be used for direct operation without gearing.

C. Since there are a plurality of points of mechanical power transmission, it is possible to distribute the load and to produce strong thrust.

D. The construction is suitable for mass production.

FIG. 5 shows another form of screw 12 for use with roller units as described above. The screw 12 includes a cylindrical steel body 13 closed at both ends by discs 14, from each end of which a shaft 15 projects axially outwardly. The body 13 has a spiral dovetail-shaped groove 16 formed in its outer wall having a constant pitch.

A helical thread member 17 is made of angle steel or steel belt is mounted in the groove 16, the member 17 being trapezoidal in cross section and having a bottom tenon portion 18 for engagement with the groove 16. The thread member 17 is engaged in the groove 16 by inserting it from one end of the groove, and it is secured thereto by welding or pinning it at both ends and at intermediate spots.

The advantages of the screw shown in FIG. 5 are as follows:

A. It is easy to obtain a desired radial size of the thread, which must be large when the screw is used in a lift or when a large thrust is required.

B. The diameter of the hollow screw body 13 can be set to enlarge the angle of the thread 17.

C. Even if the screw has a large diameter, it is lightweight.

D. Since the thread 17 is constructed independently from the cylindrical body 13, no machining or cutting for a large thread is required. Therefore, the screw is easy to make and suitable for mass production.

E. It is simple to provide a screw having a length as desired for a particular operation.

FIG. 6 shows a link chain 21 type of arrangement, for supporting roller units which are similar to the roller units 1 described above, for engagement with screws preferably for vertical movement. The link chain 21 supports pairs of radially spaced parallel roller units 23, each having axially spaced peripheral flanges 23a formed thereon. Each unit 23 has a shaft 24 projecting axially outwardly. Thus, this embodiment of the invention includes roller means formed by one or more of the roller units 23. The shafts 24 of each pair of units 23 are journaled at each end on a link bracket 25. Each unit 23 is urged axially upwardly (in the case of a vertical assembly) by a belleville spring 27 mounted on the shaft 24 at the lower end of the unit. The brackets 25 of the roller unit pairs are interconnected in end-to-end relation by link plates 26 which bridge adjacent brackets 25. Each unit 23 of each pair is axially aligned with one unit 23 of the adjacent pairs.

FIGS. 7-9 show the combination of the link chain 21, which is, for example, fixed to a frame or wall (not shown) so as to extend vertically, with a pair of radially spaced parallel screws 28. The screws 28 are quadruple-threaded, and may instead be double-threaded if the axial position of one of the roller units 23 is adjusted.

The threads of both screws 28 extend in the same spiral direction.

The screws 28 are journaled at both ends by bearings 29 on a lift 30 or the like. The screws 28 extend in parallel with the roller units 23 and are located between them, as best shown in FIG. 9, with the threads in engagement with the flanges 23a. The screws 28 are long enough to engage pairs of axially adjacent roller units 23.

In operation, the screws 28 are rotated in the same direction through universal joints 31 and driving shafts 32 so as to vertically move along the link chain 21, while the roller units are forced to rotate with them.

Since the roller units 23 are connected or combined in the form of a chain, each unit can have a short length, and the limit of the thrust load on them depends greatly on the capacity of the thrust bearings,. There is no advantage to increasing the number of the flanges 23a, and therefore the screws 28 should always engage a plurality of the axially spaced roller units 23, as illustrated.

The engaging conditions at plurality of roller units 23, as described above, can be made uniform by providing the belleville springs 27. This eliminates dimensional errors in the engagement of the flanges 23a of the units 23.

What is claimed is:

1. Apparatus for converting rotation drive into linear thrust, comprising cylindrical roller means, a plurality of annular peripheral flanges on the outer periphery of said roller means at axially spaced locations, said flanges having a substantially constant pitch therebetween, and screw means extending in parallel with said roller means and adapted to be rotatably driven, said screw means including an outer thread having a pitch for engagement with said flanges and said thread engaging at least some of said flanges, said roller means being adapted to be journaled on a fixed body and to extend vertically, said roller means comprising two radially spaced parallel roller units, said screw means being adapted to be journaled on a movable body and comprising two radially spaced parallel screws, each of said screws engaging both of said units, and at least one of said screws being adapted to be driven.

2. Apparatus according to claim 1, wherein said screws are quadruple-threaded and adapted to be driven in the same direction.

* * * * *